United States Patent [19]

Odaka et al.

[11] 4,317,109

[45] Feb. 23, 1982

[54] PATTERN RECOGNITION SYSTEM FOR HAND-WRITTEN CHARACTERS OPERATING ON AN ON-LINE REAL-TIME BASIS

[75] Inventors: Kazumi Odaka, Tokorozawa; Isao Masuda, Higashi-Kurume, both of Japan

[73] Assignee: Nippon Telegraph & Telephone Public Corp., Tokyo, Japan

[21] Appl. No.: 140,448

[22] Filed: Apr. 17, 1980

[30] Foreign Application Priority Data

May 18, 1979 [JP] Japan .................................. 54-61146

[51] Int. Cl.$^3$ .............................................. G06K 9/46
[52] U.S. Cl. ...................... 340/146.3 AC; 340/146.3 J
[58] Field of Search ............ 340/146.3 SY, 146.3 SG, 340/146.3 AC

[56] References Cited

U.S. PATENT DOCUMENTS

| | | | |
|---|---|---|---|
| 3,111,646 | 11/1963 | Harmon | 340/146.3 SG |
| 3,133,266 | 5/1964 | Frishkopf | 340/146.3 SG |
| 4,024,500 | 5/1977 | Herbst et al. | 340/146.3 SG |
| 4,028,674 | 6/1977 | Chuang | 340/146.3 SY |

OTHER PUBLICATIONS

Hanaki et al., "An On-Line Character Recognition . . . ", *Pattern Recognition*, vol. 8, Apr. 1976, pp. 63–71.
Arakawa et al., "On-Line Recognition of Handwritten Characters", *Review of the Electrical Communication Laboratories*, vol. 26, Nos. 11-12, Nov.-Dec. 1978.
Groner et al., "On-Line Computer Classification of Handprinted Chinese Characters", *IEEE Trans. on Electronic Computers*, Dec. 1967, pp. 856–860.

*Primary Examiner*—Leo H. Boudreau
*Attorney, Agent, or Firm*—Armstrong, Nikaido, Marmelstein & Kubovcik

[57] ABSTRACT

The present system comprises (a) a character input unit for providing the coordinates of a plurality of points of an input character, (b) a pre-process unit for normalizing the size and the position of said input character, (c) three points approximate unit for providing three feature points for each stroke of the input character, (d) a reference pattern storage for providing the coordinates of the feature points for each stroke of the reference characters, (e) a stroke difference calculator for providing the sum $p_i$ of the length between the feature points of the k'th stroke of the input character and the feature points of the i'th stroke of the j'th reference character, (f) a storage for storing the stroke difference $p_i$, (g) means for operating the members (e) and (f) repetitively for all the strokes of the j'th reference character, (h) means for detecting the minimum value $p_{min}$ among the stroke difference $p_i$ thus obtained, (i) means for operating the members (e), (f), (g) and (h) repetitively for all the strokes of the input character, and accumulating the value $p_{min}$ to provide the value $d\theta_j$, which is the pattern difference between the input character and the j'th reference character, (j) a storage for storing the value $d\theta_j$, (k) means for operating the members (i), and (j) repetitively for all the reference characters to provide the set of $d\theta_j$ for the given input character, and (l) means for detecting the minimum value among the values $d\theta_j$ and determining the input character as the reference character which provides the minimum value of $d\theta_j$.

2 Claims, 6 Drawing Figures

|  | $X_1$ | $X_2$ | $X_3$ | $X_4$ | $X_5$ | $X_6$ |
|---|---|---|---|---|---|---|
| $S_1^k$ | ⓟ$_{11}$ | $P_{12}$ | $P_{13}$ | $P_{14}$ | $P_{15}$ | $P_{16}$ |
| $S_2^k$ | $P_{21}$ | ⓟ$_{22}$ | . | . | . | . |
| $S_3^k$ | $P_{31}$ | . | $P_{33}$ | ⓟ$_{34}$ | . | . |
| $S_4^k$ | $P_{41}$ | . | . | $P_{44}$ | ⓟ$_{45}$ | . |
| $S_5^k$ | $P_{51}$ | . | . | . | $P_{55}$ | ⓟ$_{56}$ |
| $S_6^k$ | $P_{61}$ | . | ⓟ$_{63}$ | . | . | $P_{66}$ |

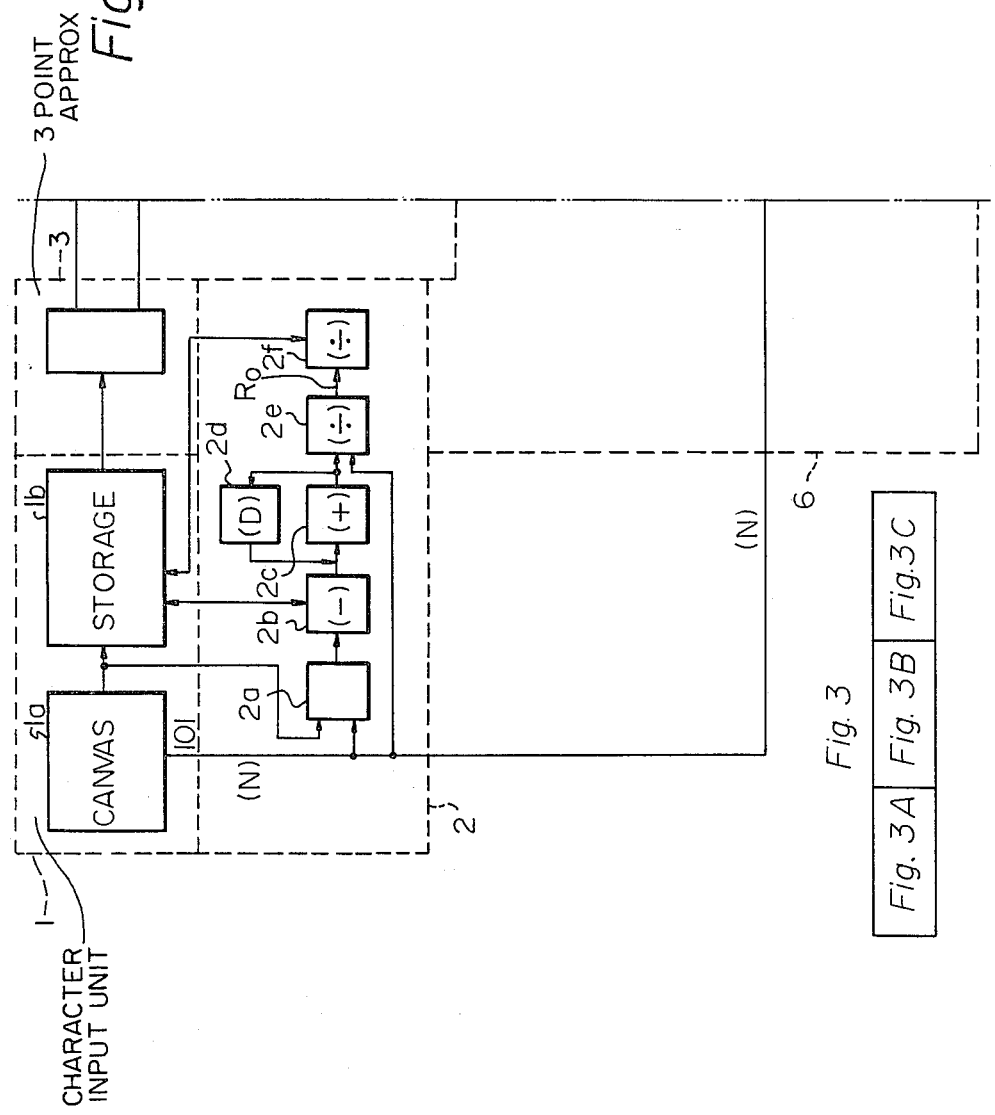

PATTERN RECOGNITION SYSTEM FOR HAND-WRITTEN CHARACTERS OPERATING ON AN ON-LINE REAL-TIME BASIS

BACKGROUND OF THE INVENTION

The present invention relates to a pattern recognition system for a hand-written character, in particular, relates to such a system which operates in a real-time on-line condition, and recognizes correctly both a simple character and a complicated character having both straight strokes and curved strokes, even when each of the strokes of the character are written in the wrong order.

There have been proposed many systems as an on-line pattern recognition system. The U.S. patent application Ser. No. 98,813 filed Nov. 30, 1979 and assigned to the assignee of the present application is one of them, and comprises a character input unit for providing the coordinates of a plurality of points on the strokes of a written input character, a classification unit for classifying the input characters to the first group having equal to or less than three strokes, and the second group having equal to or more than four strokes, an approximate unit for providing a plurality of feature points to each of strokes, the number of feature points being six for each stroke in the first group of characters and three for each stroke in the second group of characters, a pattern difference calculator for providing the sum of the length between the feature points of the input character and those of the reference characters which are stored in the reference pattern storage, and a minimum difference detector for determining the minimum length among the pattern differences thus calculated. The input character is then recognized to be the same as the reference character which provides said minimum length.

For example, when the input character is the pattern "T" having the horizontal stroke "—" and the vertical stroke "⊥", the first comparison is carried out between the input stroke "—" and the reference stroke stored in the reference memory. The comparison is carried out so that a plurality of the coordinates of the input stroke are compared with the corresponding coordinates of the reference stroke, and the result of the first comparison is stored in the memory temporarily. Next, the second comparison is performed between the second input stroke "⊥" and the reference stroke for the second stroke. The result of the first comparison and the result of the second comparison are added to each other, and the sum is stored temporarily. The comparison of the input character is carried out for all the reference characters, and the minimum sum of the comparisons is searched for among the temporary storage. Thus, the reference character "T" provides the minimum sum, then, the input character is recognized as the pattern "T".

Accordingly, if the input character is written in a wrong stroke order, that is to say, when the vertical stroke "⊥" is written first, and the horizontal stroke "—" is written secondly, the first input stroke "⊥" will be compared with the stroke "—" of the reference character, and the second input stroke " " will be compared with the stroke "⊥" of the reference character, the sum of the comparison or the pattern difference between the input character and the reference character will be very large. Thus, the input character would be recognized wrong.

Although there is less opportunity of wrong writing order in an alphabetical character, there is much possibility of the same in a complicated Chinese character and/or a Japanese character, and the wrong order of the writing would make the pattern recognition almost impossible in a prior art.

SUMMARY OF THE INVENTION

It is an object of the present invention, therefore, to overcome the disadvantages and limitations of prior pattern recognition systems by providing a new and improved pattern recognition system.

Another object of the present invention is to provide a pattern recognition system, which can recognize a hand-written character even when said character is written with an arbitrary stroke order.

The above and other objects are attained by a pattern recognition system for hand-written characters operating on an on-line real-time basis comprising (a) a character input unit for providing the coordinates of a plurality of points on strokes of an input character, (b) a preprocess unit for normalizing the size and the position of said input character, (c) means for providing the predetermined number of feature points for each stroke of the input character, (d) a reference pattern storage for providing the coordinates of the feature points for each stroke of the reference characters, (e) a stroke difference calculator for providing the sum $p_i$ of the length between the feature points of the k'th stroke of the input character and the feature points of i'th stroke of the j'th reference character, (f) a storage for storing the stroke difference $p_i$, (g) means for operating the members (e) and (f) repetitively for all the strokes of the j'th reference character, (h) means for detecting the minimum value $p_{min}$ among the stroke differences $p_i$ thus stored, (i) means for operating the members (e), (f), (g) and (h) repetitively for all the strokes of the input character, and accumulating the value $p_{min}$ to provide the value $d\theta_j$, which is the pattern difference between the input character and the j'th reference character, (j) a storage for storing the value $d\theta_j$, (k) means for operating the members (i) and (j) repetitively for all the reference characters to provide the set of $d\theta_j$ for the given input character, and (l) means for detecting the minimum value among the values $d\theta_j$ and determining the input character as the reference character which provides the minimum value of $d\theta_j$.

BRIEF DESCRIPTION OF THE DRAWINGS

The foregoing and other objects, features, and attendant advantages of the present invention will be appreciated as the same become better understood by means of the following description and accompanying drawings wherein;

FIGS. 3A, 3B, and 3C are the detailed block diagram of the other embodiment of the present character recognition system.

DESCRIPTION OF THE PREFERRED EMBODIMENTS

Figure 1:
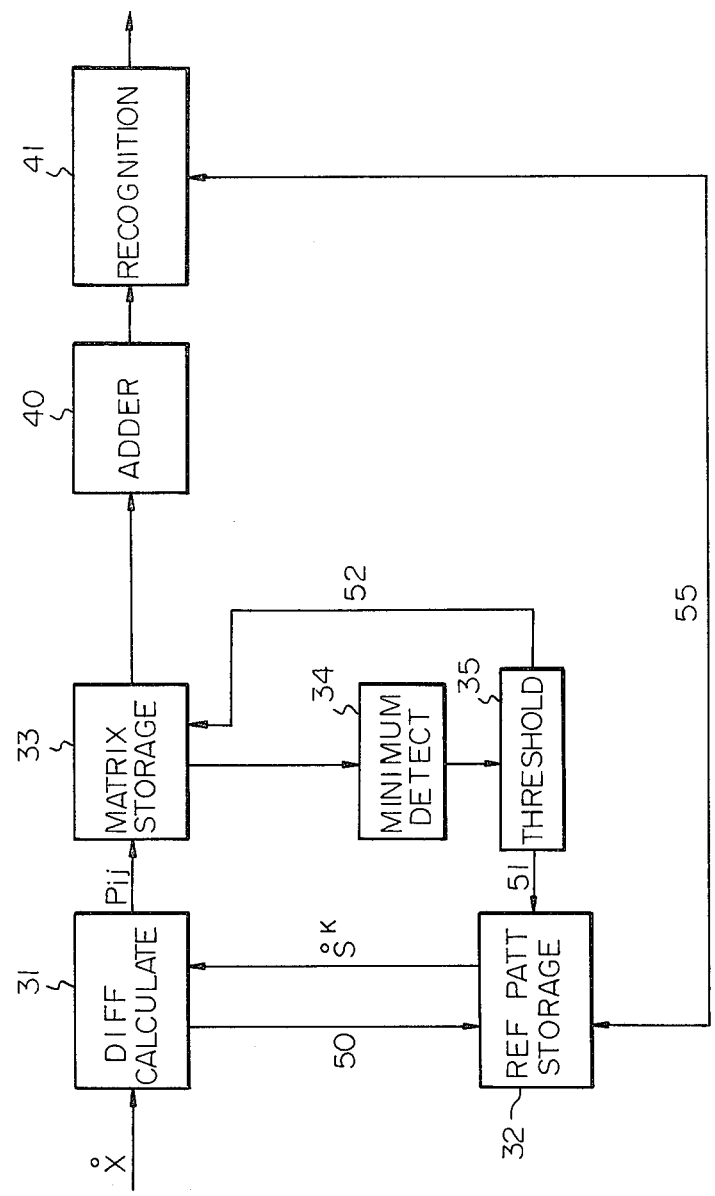
FIG. 1 is the brief block diagram of the present character recognition system.
Figures 2, 4:
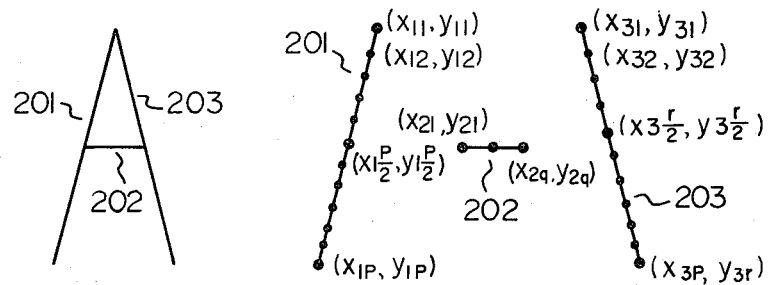
FIG. 2 shows the stroke difference table having the matrix of the stroke difference utilized in the present pattern recognition system.
FIG. 4 shows the example of the character to be recognized for the explanation of the operation of the present invention.

FIG. 1 shows the brief block diagram of the present pattern recognition system, and FIG. 2 shows the stroke difference table for the explanation of the concept of the present invention.

In FIG. 1, the reference numeral 31 is the stroke difference calculator which receives the input character. The input character is applied to that calculator 31 with the coordinates of three points for each stroke. When the input character $\dot{X}$ has n strokes, and each stroke is represented as $X_1, X_2, X_3 \ldots X_n$, then the input character $\dot{X}$ is expressed as below.

$$\dot{X} = (X_1, X_2, X_3, \ldots X_n)$$

where each of $X_i$ has three pairs of coordinates. The calculator 31 informs the reference pattern storage 32 that the input character has n strokes through the line 50. Then, the reference pattern storage 32 selects the reference pattern $\dot{S}^k$ which has n strokes, and that selected reference pattern is sent to the calculator 31. It is supposed that the reference pattern $\dot{S}^k$ has the strokes $S_1^k, S_2^k, \ldots S_n^k$ and the reference pattern is expressed as follows.

$$\dot{S}^k = (S_1^k, S_2^k, \ldots S_n^k)$$

It should be appreciated that there is a possibility that the input character is written in a wrong stroke order, each stroke of the input character does not necessarily correspond to the relating stroke of the reference character. That is to say, $X_i = S_i^k$ is not always satisfied, although the input character is the same as the reference character. Accordingly, the calculator 31 calculates the stroke difference $p_{ij}$ between the i'th stroke of the input character and the j'th stroke of the reference character, where i and j are integers from 1 to n, and the result of $p_{ij}$ is stored in the matrix storage 33 as shown in FIG. 2. In FIG. 2, the $p_{11}$ is the stroke difference between the first stroke $X_1$ of the input character and the first stroke $S_1$ of the reference character, and $p_{12}$ is the also stroke difference between the first stroke $X_1$ of the input character and the second stroke $S_2$ of the reference character. The minimum value detector 34 detects the element which has the minimum value among the each column in the matrix in FIG. 2. In FIG. 2, the element surrounded by a circle is supposed to have the minimum value in each column. The minimum value detector 34 applies the detected minimum value (the element surrounded by a circle) to the threshold circuit 35, which examines whether the minimum value thus obtained is less than the predetermined threshold. If the answer is no, that is to say, the minimum value is larger than the predetermined value, the threshold circuit 35 informs the result to the reference pattern storage 32 through the signal line 51. The reference pattern storage 32, then, informs the recognition circuit 41 through the signal line 55, that the input character $\dot{X}$ does not coincide with the reference character $\dot{S}^k$ which is now examined. Then, the reference pattern storage 32 selects the next reference pattern $\dot{S}^m$ which has also n strokes and the selected reference pattern $\dot{S}^m$ is applied to the calculator 31. Then, the calculator 31 compares the input character with the reference pattern $\dot{S}^m$ as described before.

If the answer of the threshold circuit 35 is yes, that is to say, the minimum value is equal to or smaller than the predetermined threshold value, the threshold circuit 35 informs that fact to the matrix storage 33 through the signal line 52. Upon receipt of the yes signal through the signal line 52, the matrix storage 33 transfers the minimum values in each columns (the elements with a circle in FIG. 2) to the adder 40.

Then the adder 40 calculates the sum of each minimum values in each of the columns. In the example of FIG. 2, the sum is;

$$p_{11} + p_{22} + p_{34} + p_{45} + p_{56} + p_{63}$$

The sum of the addition is transferred to the recognition circuit 41.

Then, the recognition circuit 41 stores the sum thus obtained in the memory together with the number or the flag of the reference character which relates to that sum. And the recognition circuit 41 instructs through the signal line 55 the reference pattern storage 32 to transfer the next reference pattern to the calculator 31.

The above operation is repeated for all the n-strokes reference patterns stored in the reference pattern storage 32. When all the operations are finished, the recognition circuit has the sums relating to all the n-strokes reference patterns except for those which are deleted by the signal line 51. Then, the recognition circuit 41 searches the minimum sum among the sums thus stored, and recognizes that the input character is the same as the reference character which provides the minimum sum. Then, the number or the flag of that reference character which provides the minimum sum is provided at the output line to indicate the recognized input character.

The above procedures are summarized as follows.

(Step 1) Each stroke of the input character is sampled by three coordinates.

(Step 2) The pattern length or the stroke difference between each stroke of the input character and each stroke of the selected reference character is calculated, and the matrix of the stroke difference is obtained as shown in FIG. 2.

(Step 3) In the matrix, the minimum value in each line or column is detected, and a flag is provided to the minimum element.

(Step 4) The flagged elements are summed up, and the sum is stored in the memory.

(Step 5) The steps 1 through 4 are repeated to all the reference characters.

(Step 6) The minimum sum in the step 4 is searched, and the input character is recognized to be the same as the reference character which provides that minimum sum.

Figure 3B:
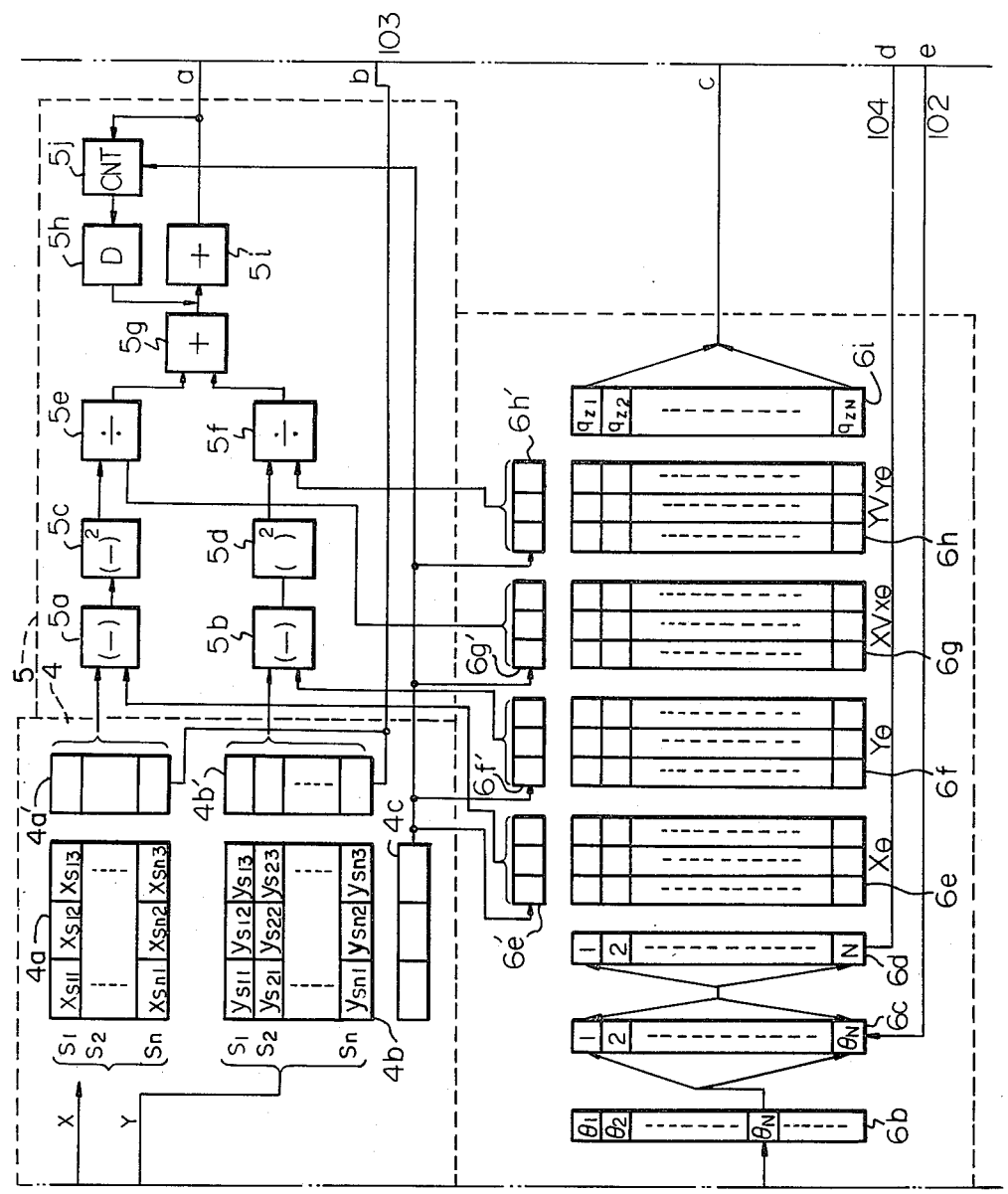

FIG. 3A and FIG. 3B show the detailed block diagram of the other embodiment of the present pattern recognition system.

Figure 3C:
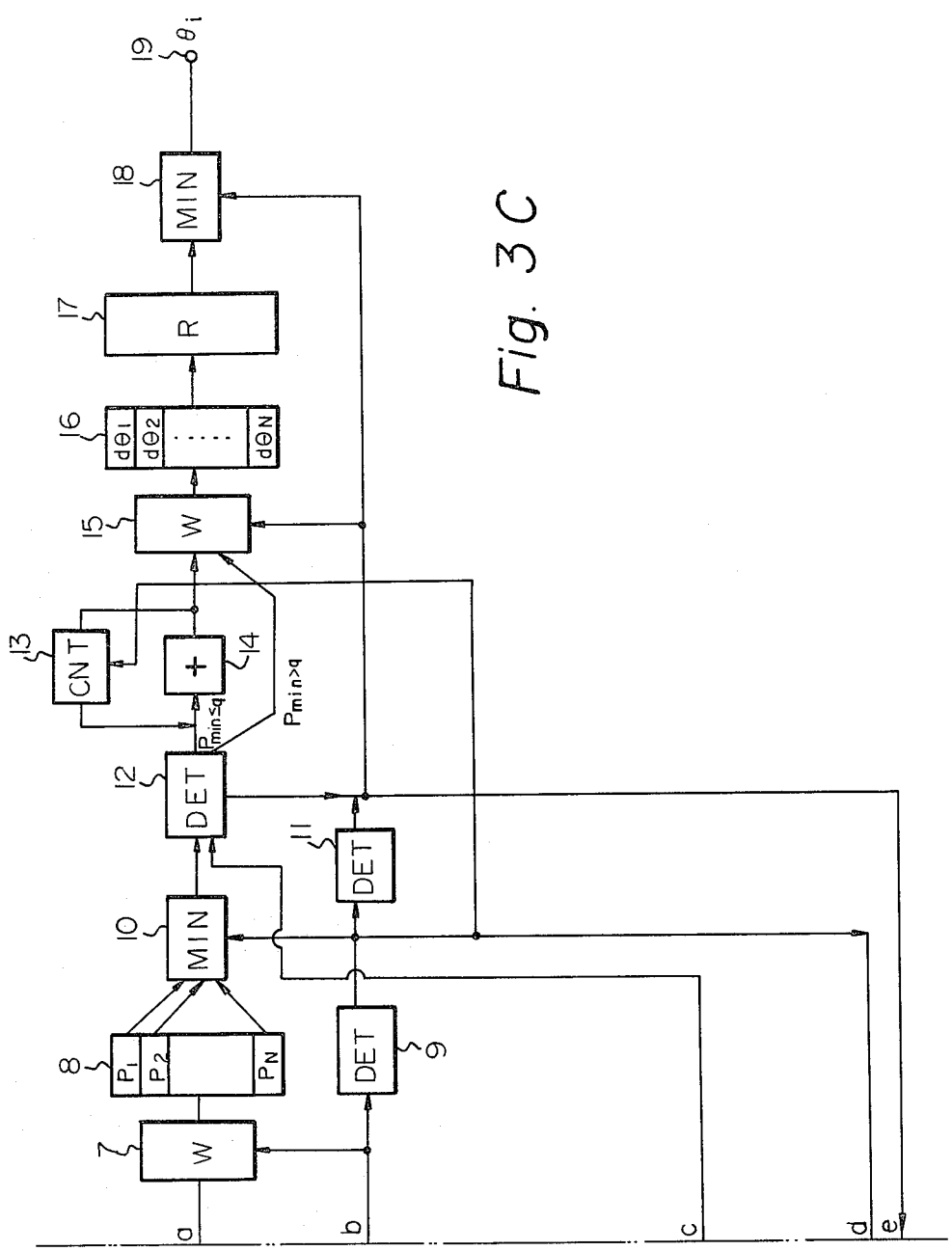

In FIG. 3, the character input unit 1 has the canvas 1a and the storage 1b. When we write a character on the canvas 1a, the x- and y- coordinates of the pen $(X_i, Y_i)$ $(i = 1, 2, 3 \ldots n$, and n is the number of sampling points) are provided by said canvas 1a in every predetermined length of the movement of the pen, and said coordinates are stored in the storage 1b. Also, when we complete the writing of each character, the number (n) of the sampled coordinates in the character is provided on the character end signal line 101. The example of said character input unit is commercially purchased as the type 4953/4954 graphic tablet manufactured by Sony-Techtronics Co., Ltd. in Tokyo, Japan, or the grafacon (model 1010A/2020) manufactured by Communication Science Corporation in Tokyo, Japan.

Next, the center of the character is calculated by the center calculator $2a$ in the pre-process unit 2. The center coordinates are obtained separately for each X-coordinate and Y-coordinate. The X-coordinate of the center ($\overline{X}$) is obtained by summing up all the X-coordinates ($X_1, X_2, X_3 \ldots X_n$) of the sampled points, and dividing the sum by the sampled number (n) on the line 101. That is to say, the X-coordinate ($\overline{X}$) of the center is obtained by the formula below.

$$\overline{X} = (1/n) \sum_{i=1}^{n} X_i$$

Similarly, the Y-coordinate ($\overline{Y}$) of the center is obtained by the formula;

$$\overline{Y} = (1/n) \sum_{i=1}^{n} Y_i$$

Thus, the coordinates of the center of the character ($G = (\overline{X}, \overline{Y})$) are obtained.

The subtractor $2b$ converts the coordinates stored in the storage $1b$ to the coordinates with the origin G which is the center thus obtained. The conversion is performed by subtracting $\overline{X}$ from each X-coordinates in the storage $1b$, and subtracting $\overline{Y}$ from each Y-coordinates in the storage. The converted coordinates replace the contents of the storage $1b$. At the same time, the length ($R_i$) between each converted coordinates and the origin (G) is applied to the adder 2C. Said length ($R_1$) for all the sampled points is accumulated by utilizing said adder 2C and the delay circuit $2d$. The divider $2e$ divides the accumulated length by the sampled number (n), and provides the mean radius ($R_O$) of the character as follows;

$$R_o = (1/n) \sum_{i=1}^{n} R_i$$

Another divider $2f$ normalizes the size of the character by dividing each of the converted coordinates (X, Y) in the storage $1b$ by said mean radius ($R_O$). Thus, the pre-process is finished, and the size and the center of the input character are normalized.

The three points approximation unit 3 takes three coordinates which are just normalized from all the sampled coordinates for each stroke. Those three points are for instance the initial point of the stroke, the center point of the stroke and the end point of the stroke, and the feature of the stroke is represented by those three points. Therefore, those three points are called as feature points. The coordinates of those three points are stored in the input character storage 4.

FIG. 4 shows the example of the three points approximation. Assuming that the pattern of the input character is "A" having three strokes 201, 202 and 203, then the coordinates of a plurality points on the first stroke 201 are $(x_{11}, y_{11})$, $(x_{12}, y_{12})$, ... $(x_{1p}, y_{1p})$, the coordinates of the second stroke 202 are $(x_{21}, y_{21})$ ... $(x_{2q}, Y_{2q})$, and the coordinates of the third stroke are $(x_{31}, y_{31})$ ... $(x_{3r}, y_{3r})$. The three points approximation unit 3 picks up three points from the coordinates on each stroke. Then, the feature points on the first stroke 201 are $(x_{11}, y_{11})$ which is the initial point of the stroke, $(x_{1,p/2}, y_{1,p/2})$ which is the center point of the stroke. When the value p/2 is not an integer, the coordinates closest to the center is picked up as a center point. The third feature point on the first stroke 201 is $(x_{1p}, y_{1p})$. Similarly, the feature points on the second stroke 202 are $(x_{21}, y_{21})$, $(x_{2\,q/2}, y_{2\,q/2})$ and $(x_{2q}, y_{2q})$. The feature points on the third stroke 203 are $(x_{31}, y_{31})$, $(x_{3\,r/2}, y_{3\,r/2})$, and $(x_{3r}, y_{3r})$. Each stroke is represented by those three feature points, which are stored in the storage 4.

Again in FIGS. 3A and 3B, the stroke difference calculator 5 calculates the length or the difference $p_{11}$ between the first stroke $S_1$ of the first reference character $\theta_1$ and the first stroke $X_1$ of the input character. The formula for the calculation is shown below.

$$P_{11} = \sum_{i=1}^{3} (x_{sli} - {_x}S_{li}^{\theta_1})^2 / XV_{li}^{\theta_1} + \sum_{i=1}^{3} (y_{sli} - {_y}S_{li}^{\theta_1})^2 / YV_{li}^{\theta_1}$$

where
i is the number of the feature points in each stroke and i = 1, 2 or 3.
$x_{sli}$ is the x-coordinate of the first stroke of the input character,
$y_{sli}$ is the y-coordinate of the first stroke of the input character, $${_x}S_{li}^{\theta_1}$$

is the x-coordinate of the first stroke of the reference character $\theta_1$, $${_y}S_{li}^{\theta_1}$$

is the y-coordinate of the first stroke of the reference character $\theta_1$, $$XV_{li}^{\theta_1}$$

is the x-variance of the first stroke of the reference character $\theta_1$, and $$YV_{li}^{\theta_1}$$

is the y-variance of the first stroke of the reference character $\theta_1$.

The input character storage 4 has the x-coordinate storage $4a$ which stores the x-coordinate of three points in each stroke of the input character, the y-coordinate storage $4b$ which stores the y-coordinate of three points in each stroke of the input character, the read-out unit $4a'$ for reading the storage $4a$, the read-out unit $4b'$ for reading the storage $4b$, and the counter $4c$ which indicates which feature point of the stroke of the input character is now treated.

The reference character storage 6 has the table $6b$ which stores the number of the reference characters for each number of strokes. The table $6b$ is referred to through the line 101 which indicates the number of strokes of the input character. The reference character storage 6 has also the counter $6c$ showing which reference character is now examined, the counter $6d$ showing which stroke of each reference character is now examined, the storage $6e$ which stores the x-coordinate of the reference characters, the storage $6f$ which stores the y-coordinate of the reference characters, the storage 6g which stores the x-variance of the reference character, the storage 6h which stores the y-variance of the reference character, and the table 6i which stores the threshold value for each stroke.

Returning to FIG. 3A, the subtractor 5a receives the x-coordinate of the input character from the input character storage 4 and the x-coordinate of the reference character from the reference character storage, and provides the difference between them. The subtractor 5b receives the y-coordinate of the input character from the input character storage 4 and the y-coordinate of the reference character from the reference character storage 6, and provides the difference between them. The square circuits 5c and 5d provides the squares of the outputs of the subtractors 5a and 5b, respectively. The divider 5e divides the output of the square circuit 5c by the x-variance from the storage 6g, and the divider 5f divides the output of the square circuit 5d by the y-variance from the storage 6h. The outputs of those dividers 5e and 5f are summed-up by the adder 5g.

The above calculation is repeated three times for other feature points, and the point difference relating to the second and third feature points between the input character and the reference character is obtained at the output of the adder 5g. The outputs of said adder 5g are accumulated three times utilizing the adder 5i, the delay circuit 5h and the counter 5j, where the delay circuit 5h delays the output of the adder 5i by the time requested for the calculation of the point difference of the next feature point. When the calculation process is repeated by three times, the content of the counter 5j reaches three, and the calculation of the point differences for the first stroke of the input character is finished, and then the stroke difference of that first stroke is obtained at the output of the adder 5i.

It should be appreciated in the above explanation that the counter 4c showing which feature point in the stroke is now been treated, controls the counter 5j, the read-out units 6e', 6f', 6g' and 6h' for reading the reference pattern storage.

The output of the adder 5i is stored in the storage 8 as the first element $p_1$ of the matrix through the write-unit 7. The address of the storage 8 is defined by the signal on the line 103 which indicates which stroke is now being treated.

Next, the stroke number on the signal line 103 is incremented to two, and the element $p_2$ for the second stroke is calculated and is stored in the storage 8. By repeating this calculation, the stroke differences $p_1$ through $p_n$ of all the strokes of the input character with regard to the first stroke of the first reference character $\theta_1$ are finished, and the result is stored in the storage 8.

When all the elements $p_1$ through $p_n$ are calculated, the detector 9 generates the control signal which increments the counter 6d, and then, the stroke number in the counter 6d is increased by one. At the same time, the detector 9 triggers the minimum value detector 10, which provides the minimum value among the content of the storage 8 or the minimum value among $p_1$ through $p_n$. The detected minimum value $p_{min}$ is applied to the detector 12.

The detector 12 receives also the threshold value $q_{zl}$ from the threshold table 6i. Said threshold value $q_{zl}$ is the threshold of the stroke difference of the first stroke of the reference character. The detector 12 compares the minimum value $p_{min}$ with the threshold $q_{zl}$, and when $p_{min}$ is equal to or smaller than $q_{zl}$, the detector 12 transfers the minimum value $p_{min}$ to the adder 14. When the minimum value $p_{min}$ is larger than the threshold $q_{zl}$, the detector 12 generates the control signal to increment the counter 6c which shows what reference character is now treated, and stops all the calculations for the first reference character $\theta_1$ and stores the maximum value as the pattern difference $d\theta_1$ in the storage 16 through the write circuit 15. In this case the counter 6c is incremented by one, and so the second reference character $\theta_2$ is compared with the input character through the above mentioned process.

When that minimum value $p_{min}$ is equal to or smaller than $q_{zl}$, the second stroke of the first reference character is compared with the input character and the matrix $p_1$ through $p_n$ with regard to the second stroke of the first reference character is calculated in the storage 8, and the minimum value among $p_1$ through $p_n$ with regard to the second stroke of that reference character is detected.

The above process is repeated by the number of the strokes of the first reference character, and the output of the detector 12 is accumulated by the adder 14 and the counter 13. That is to say, the accumulated output of the adder 14 is shown below.

$$d\theta_1 = \sum_{i=1}^{N} p_{min}$$

It should be appreciated that accumulated output corresponds to the sum of the circled elements in FIG. 2, and is the pattern difference between the input character and the first reference character.

When the stroke number in the counter 6d reaches (n), the detector 11 detects that fact, and the detector 11 increments the category counter 6c, and then, the same calculation is performed with regard to the second reference character. Thus, the pattern difference $d\theta_2$ between the input character and the second reference character is obtained in the storage 16.

By repeating the above calculation, the pattern differences $d\theta_1$ through $d\theta_n$ between the input character and all the reference characters are obtained in the storage 16.

Then, the content of the storage 16 is read one after another, and the minimum value among the storage 16 is detected by the minimum value detector 18. And the input character is recognized to be the same as the reference character which provides the minimum value among $d\theta_1$ through $d\theta_n$. The recognized output is provided at the output 19 of the minimum value detector 18 as the category number of the reference character.

As mentioned above in detail, according to the present invention, an input character can be recognized on an on-line real-time basis even when the input character is written in wrong stroke order. Accordingly, the present invention is beneficial to the application for the real-time and on-line character recognition system for a hand-written character.

In particular, the present invention is beneficial for recognizing a Chinese character and/or a Japanese character in which there is much possibility of wrong writing order.

From the foregoing, it will now be apparent that a new and improved character recognition system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A pattern recognition system for handwritten characters operating on an on-line real-time basis comprising:
   (a) a character input unit for providing the coordinates of a plurality of points of an input character, the input character being formed by a plurality of strokes,
   (b) a pre-process unit for normalizing the size and the position of said input character,
   (c) means for providing a plurality of feature points for each stroke of the input character,
   (d) a reference pattern storage for providing the coordinates of the feature points for each stroke of a plurality of reference characters,
   (e) a stroke difference calculator for providing a stroke difference $p_i$ which is the sum of the length between the feature points of the k'th stroke of the input character and the feature points of the i'th stroke of the j'th reference character, where i, j and k are integers,
   (f) a storage for storing the stroke difference $p_i$,
   (g) means for operating the members (e) and (f) repetitively by incrementing the value i for all the strokes of the j'th reference character,
   (h) means for detecting the minimum value $p_{min}$ among the stroke differences $p_i$ thus stored,
   (i) means for operating the members (e), (f), (g) and (h) repetitively for by incrementing the value k all the strokes of the input character, and accumulating the value $p_{min}$ to provide the value $d\theta_j$, which is the pattern difference between the input character and the j'th reference character,
   (j) a storage for storing the value $d\theta_j$,
   (k) means for operating the members (i) and (j) repetitively for all the reference characters to provide the set of $d\theta_j$ for the given input character,
   (l) means for detecting the minimum value among the values $d\theta_j$, and determining the input character as the reference character which provides the minimum value of $d\theta_j$.

2. A pattern recognition system for hand-written characters according to claim 1, wherein the predetermined number of feature points for each stroke of the input character is three and those three feature points are the initial point, the center point and the end point of each stroke.

* * * * *